United States Patent
Michele et al.

(10) Patent No.: US 6,565,203 B2
(45) Date of Patent: May 20, 2003

(54) INK COMPOSITION, INK PRINTING PROCESS AND INK PRINTING MEANS

(75) Inventors: Helmut Michele, Castrop-Rauxel (DE); Dirk Klein, Breckerfeld (DE); Peter Busch, Bochum (DE)

(73) Assignee: Artech GmbH Design + Production in Plastic (DE)

( * ) Notice: Subject to any disclaimer, the term of this patent is extended or adjusted under 35 U.S.C. 154(b) by 0 days.

(21) Appl. No.: 10/066,791

(22) Filed: Feb. 6, 2002

(65) Prior Publication Data

US 2002/0111396 A1 Aug. 15, 2002

(30) Foreign Application Priority Data

Feb. 9, 2001 (DE) ......................................... 101 06 027

(51) Int. Cl.⁷ .................................................. B41J 2/01
(52) U.S. Cl. ........................ 347/100; 347/96; 106/31.6
(58) Field of Search .......................... 347/100, 96, 101; 106/31.28, 31.41, 31.6, 31.13

(56) References Cited

U.S. PATENT DOCUMENTS 5,236,621 A  *  8/1993  DiPietro ................ 252/301.35

FOREIGN PATENT DOCUMENTS

| DE | 692 07 651 | 2/1996 | | |
|---|---|---|---|---|
| DE | 196 80 301 | 12/2002 | | |
| EP | 07676225 A2 | * 10/1996 | ............ | B41J/2/01 |
| EP | 0 767 225 | 4/1997 | | |
| EP | 0 822 238 | 2/1998 | | |

* cited by examiner

*Primary Examiner*—Lamson Nguyen
*Assistant Examiner*—Manish Shah
(74) *Attorney, Agent, or Firm*—Hoffman, Wasson & Gitler PC

(57) ABSTRACT

Ink composition, especially for inkjet printing apparatus, which includes an aqueous liquid vehicle in which solid pigment particles are dispersed. To achieve improved functionality for producing water-resistant printouts, the pigment particles are made as continuously colored thermoplastic particles. Moreover, the subject matter of the invention is an ink printing process matched to this ink composition and as well an ink printing apparatus therefore.

10 Claims, No Drawings

INK COMPOSITION, INK PRINTING PROCESS AND INK PRINTING MEANS

This invention relates to an ink composition, especially for inkjet printing means, which comprises an aqueous liquid vehicle in which solid pigment particles are dispersed. Furthermore, the subject matter of the invention is an ink printing process matched to this ink composition and an ink printing means for executing this ink printing process.

Pigment inks are essentially suspensions in which the actual coloring agent is present as a solid in the form of pigment particles which are dispersed in a liquid vehicle, usually water-based. Pigments can be organic or inorganic coloring agents on the condition that they are insoluble in the liquid vehicle. By the choice of these pigments which adhere to the printed surface after the ink dries, printouts with high color saturation and permanency can be produced which cannot be achieved with water-soluble, dye-based inks. By adding polymers which crosslink after printing, water-resistant printouts can be produced.

One basic requirement for pigment ink compositions is that the dispersion is stable over the long term, as much as possible even at elevated temperatures. This is of special importance in storage tanks or ink cartridges for inkjet printers and plotters in which the ink properties must remain as uniform as possible even when stored for a longer time and when the temperature and climate fluctuates. To ensure that the pigment particles are not able to precipitate out of the liquid vehicle and lead to malfunctions by formation of deposits and residues in the ink feed lines and printing nozzles, surface-active substances, for example, surfactants, are added as dispersion agents and settling inhibitors. By adding these additives which have a molecular structure with a hydrophilic and hydrophobic end, wetting of the suspended pigment particles is increased. In this way a certain stabilization of the dispersion can be achieved. Exact determination and matching of the additive combination to each individual pigment used are necessary since matching to interfacial properties which are different in each case between the pigment substance and liquid vehicle is necessary. This results on the one hand in considerable development cost and leads on the other hand to the fact when using different pigments divergent properties of inks can hardly be avoided.

Another problem arises in water-resistant pigment inks in that they must additionally contain resins or polymers which provide for water-resistant fixing of pigment particles on the printed surface. Because these substances on the one hand during printing are to permanently set, for example by water-insoluble crosslinking during drying, on the other hand the fine printing nozzles and ink supply channels however should not be adversely affected in any case, a conflict of objectives arises which can only be resolved by compromises, for example the addition of substances for delay of drying and for regular mechanical cleaning of the printing nozzles to prevent deposits. This leads both to deterioration in the drying behavior and in water resistance and also to possible adverse effects on the printing system by the unwanted fixing of ink residues there.

In view of these problems, the object of the invention is to devise an ink composition which has optimized dispersion properties with respect to use of different pigmentations and especially improved functionality for producing water-resistant printouts. Furthermore, an ink printing process matched to it and an ink printing means will be devised.

To achieve the above explained object, as claimed in the invention an ink composition is proposed, especially for inkjet printing means, in which the pigment particles are made as continuously colored thermoplastic particles. The ink printing process as claimed in the invention which is based on this ink composition provides for the dyed thermoplastic particles used as pigment particles after applying the ink being melted onto the surface by heating and thus being fixed permanently on the surface. For implementation of this ink printing process, as claimed in the invention an ink printing means is provided which as claimed in the invention has a heating means for heating the ink delivered by the printing head to the surface.

The ink composition as claimed in the invention falls under the definition of a pigment ink which as essential components has a liquid, water-based vehicle and chromophoric particles present in solid form, these pigment particles not being soluble in the liquid vehicle and thus a liquid-solid mixture being formed which is applied to the surface to be printed in ink printing, for example in inkjet printing in the form of fine ink droplets. After evaporating the liquid vehicle, the pigment particles remain in the form of printed image on the surface. So that the ink printing is water-resistant, the pigment particles must be fixed permanently and especially water-resistant on the surface. In this respect, as claimed in the invention a novel approach of a thermally fixable ink is followed which differs fundamentally from the pigment inks known in the prior art. In the known pigment inks, the dispersed pigment particles are used solely as chromophores which in the past have been fixed on the printed surface only by adding resins or polymers which crosslink after printing out to the liquid vehicle. In contrast, in the ink composition as claimed in the invention the fixing of the printed image on the surface can take place by the special embodiment of the pigment particles themselves, specifically by thermal melting. They are made specifically as continuously colored, thermoplastic particles, i.e. they consist of a thermoplastic polymer which is colored with coloring agents (dye or pigment). Due to the coloring agent these plastic particles have the same color-bearing function as the pigment particles in the prior art. In addition, an especially advantageous additional functionality arises due to the plastic material used, both with respect to the properties of the ink in terms of production, storage and processing in the printing systems, and also with respect to the printouts produced with it.

Advantageous properties with respect to the stability of the dispersion can be implemented in that the coloring agent which actually bears the color and with which the plastic pigment particles are colored as claimed in the invention, is mechanically or physically bound in the matrix of the thermoplastic. Use of a certain plastic material ensures uniform interfacial properties with respect to the liquid vehicle used, regardless of the coloring agent with which the corresponding plastic particles are colored. The interface properties which are responsible for the stability of the dispersion are determined especially in the ink composition as claimed in the invention almost solely by the plastic of the pigment particles and the liquid vehicle, and this plastic for its part can be colored with any coloring agents which are soluble or insoluble in it. This coloring agent is bound by the plastic matrix so that consequently there is no direct effect on the dispersion properties. In contrast to the pigment inks known in the prior art, in which for each pigment used an additive combination of surfactants which is matched as carefully as possible must be added to stabilize the dispersion, in the ink composition as claimed in the invention the dispersion agent need be matched only once to the interface system formed between the liquid vehicle and the plastic surface. For inks of different colors, thus the development and production costs are clearly reduced. Moreover inks with different coloring agents acquire identical dispersion properties, for example with respect to long-term stability, viscosity and the like. For a long time this was not possible due to the different dispersion properties. The ink composition as claimed in the invention therefore is especially advantageous for use in ink storage tanks or ink cartridges for inkjet printing systems in which even after longer storage uniform properties must be guaranteed.

Another advantage is that the plastic pigment particles as claimed in the invention can be produced by in-situ polymerization, the coloring agent being mechanically bound into the polymer matrix while it is being formed. In this production process a uniform size of the pigment particles can advantageously be achieved with a much lower cost than by the grinding of the solid pigment known in the prior art with subsequent classification, for example by air classification. Conversely the pigment particles as claimed in the invention with improved properties can be produced at lower production cost.

One special, fundamental advantage of the ink composition as claimed in the invention is that water-resistant and permanent fixing of the pigment particles on the printed surface takes place thermally, i.e. by melting the plastic on the surface. In this way it is possible to completely forego adding to the liquid vehicle, as is essential in the prior art, resins or polymers which crosslink after the printing process and thus are designed to provide for fixing of the pigment particles on the surface. As was explained in detail in the description of the prior art, the use of these water-insoluble resins or polymers entails diverse problems, since on the one hand for reliable fixing of the pigment particles on the surface a high concentration and prompt crosslinking are desirable, on the other hand these effects within the printing system must be precluded to prevent operating problems, for example due to clogged feed lines or ink nozzles. These problems can be precluded beforehand in the ink composition as claimed in the invention since the thermoplastic pigment particles after application to the surface can be fixed solely by the action of heat and the addition of reactive resins or polymers to the liquid vehicle is not necessary. Thus the ink composition can be optimized with respect to its thermal stability and long-term stability. The formation of deposits or residues as a result of ink settling in the nozzles and feed lines of an inkjet printing system can likewise be prevented in this way.

The coloring agent which is preferably physically and mechanically bound in the polymer matrix of the thermoplastic can be both a pigment which is insoluble in the plastic and which is mechanically enclosed in it, and also a dye which is soluble in the plastic. In principle any organic or inorganic pigments can be added to the plastic, for example carbon black as the black pigment. This pigment is added to the plastic finely dispersed with a particle size which is clearly less (order of magnitude?) than the size of the plastic particles so that they are completely penetrated. Alternatively, the plastic can be penetrated with the dyes which are soluble in it.

Furthermore, dispersion aids can be added to the aqueous liquid vehicle of the ink composition as claimed in the invention. They are additives which are in principle known and which improve the long term stability, storage stability and temperature stability of the dispersion. Essentially they are surface-active substances with a hydrophilic and hydrophobic functional group, for example tensides or the like.

The inkjet printing process as claimed in the invention using the aforementioned ink composition as claimed in the invention assumes that permanent, water-resistant records (printouts) are produced on a surface by ink which comprises pigment particles dispersed in the aqueous liquid vehicle being applied to this surface and fixed, for example in an inkjet printing process. In contrast to the prior art, the above explained ink composition as claimed in the invention is used; it comprises colored thermoplastic particles as pigment particles, these plastic particles being melted onto the surface by heating after the ink is applied and in this way being fixed permanently on the surface.

As in the known ink printing processes, in the process as claimed in the invention the ink is applied to the surface to be printed so that the aqueous liquid vehicle can evaporate and the pigment particles remain in the printed areas on the surface. But while in the known printing processes the ink particles are fixed by the resins or polymers which are contained in the liquid vehicle and which crosslink during drying, leading to the initially described problems, in the printing process as claimed in the invention the fixing of the pigment particles takes place by a separate step subsequent to ink application. In this step the plastic particles are melted on by the controlled action of heat, by which they are joined mechanically strong to the surface. This melting can take placed by radiant heat or by contact heat transfer, for example by means of a radian heater connected downstream of the printing head or a heated pressure roller or the like.

The core idea of the ink printing process as claimed in the invention consists in that the aqueous liquid vehicle forms simply the transport medium for the pigment particles which makes it possible to apply the pigment particles in a controlled manner to the surface, for example by inkjet printers or plotters. The special advantage of fixing by a downstream process step, specifically by the action of heat, allows a distinct separation of functions so that the problems which arise due to the initially described conflict of objectives which is inevitable in the prior art can be fundamentally prevented in the fixing of the pigment particles on the surface.

An ink printing means for producing ink prints using the ink printing process as claimed in the invention explained above has at least one printing head which can be connected to an ink storage tank and by which ink can be delivered to a surface to produce records (printouts). To achieve the thermal fixing of the pigment particles as claimed in the invention, there is a heating means as claimed in the invention for heating of the ink delivered by the printing head to the surface.

The heating means can comprise a radiant heater, for example a powerful halogen lamp or the like mounted in the printing direction behind the printing head. Alternatively there can be a contact heating element as the heating means, for example in the form of a heated roll, cylinder or box which is pressed either from the print side against the pigment particles deposited there or the surface of the material to be printed, for example paper or film, is heated from the back.

One advantageous development of this ink printing means calls for the heating element to be detachably mounted. In this way for example an existing inkjet printer can be refitted for executing the ink printing process as claimed in the invention by selective attachment of a radiant heater.

The pigment particles as claimed in the invention can have a similar structure to the so-called "microtoners" for photocopiers or laser printers. The plastic pigment particles are generally smaller than 10 microns (0.010 mm), typically 3–5 microns. The dyes are extruded in the resin matrix of the pigment particles or polymerized in-situ.

The invention makes it possible for the first time to apply these plastic pigment particles to a surface to be printed by an inkjet printing process. The printouts after fixing of the pigment particles on the surface, as has been explained above in detail, have especially high light fastness (UV and oxygen protection) and water resistance. Thus printouts produced with the ink composition as claimed in the invention can be kept like laser prints or photocopies.

What is claimed is:

1. An ink composition for inkjet printing means, which comprises an aqueous liquid vehicle in which solid pigment particles are dispersed, wherein the said pigment particles are made as continuously colored thermoplastic particles.

2. The ink composition as claimed in claim 1, wherein the thermoplastic particles comprise a coloring agent physically bound in a polymer matrix.

3. The ink composition as claimed in claim 1, wherein the coloring agent is a mechanically bound pigment which is insoluble in plastic.

4. The ink composition as claimed in claim 1, wherein the coloring agent is a dye which is soluble in the plastic.

5. The ink composition as claimed in claim 1, wherein the plastic particles have an average particle size of up to 1 micron.

6. The ink composition as claimed in claim 1, wherein dispersion aids are added to the aqueous liquid vehicle.

7. The ink composition as claimed in claim 1, wherein the plastic particles are polymerized in situ.

8. The ink printing process for producing permanent, water-resistant records on a surface, in which ink which comprises pigment particles dispersed in an aqueous liquid vehicle is applied to a surface and fixed to the surface, wherein colored thermoplastic particles are used as the pigment particles and are melted onto the surface by heating after application of the ink and thus are fixed permanently on the surface.

9. The ink printing process as claimed in claim 8, wherein heating takes place by radiant heat.

10. The ink printing process as claimed in claim 8, wherein heating takes place by contact heat.

* * * * *